Dec. 10, 1935.  W. A. MOIR  2,023,741
METHOD OF AND APPARATUS FOR TREATING CHOCOLATE MASSES
Filed March 25, 1933
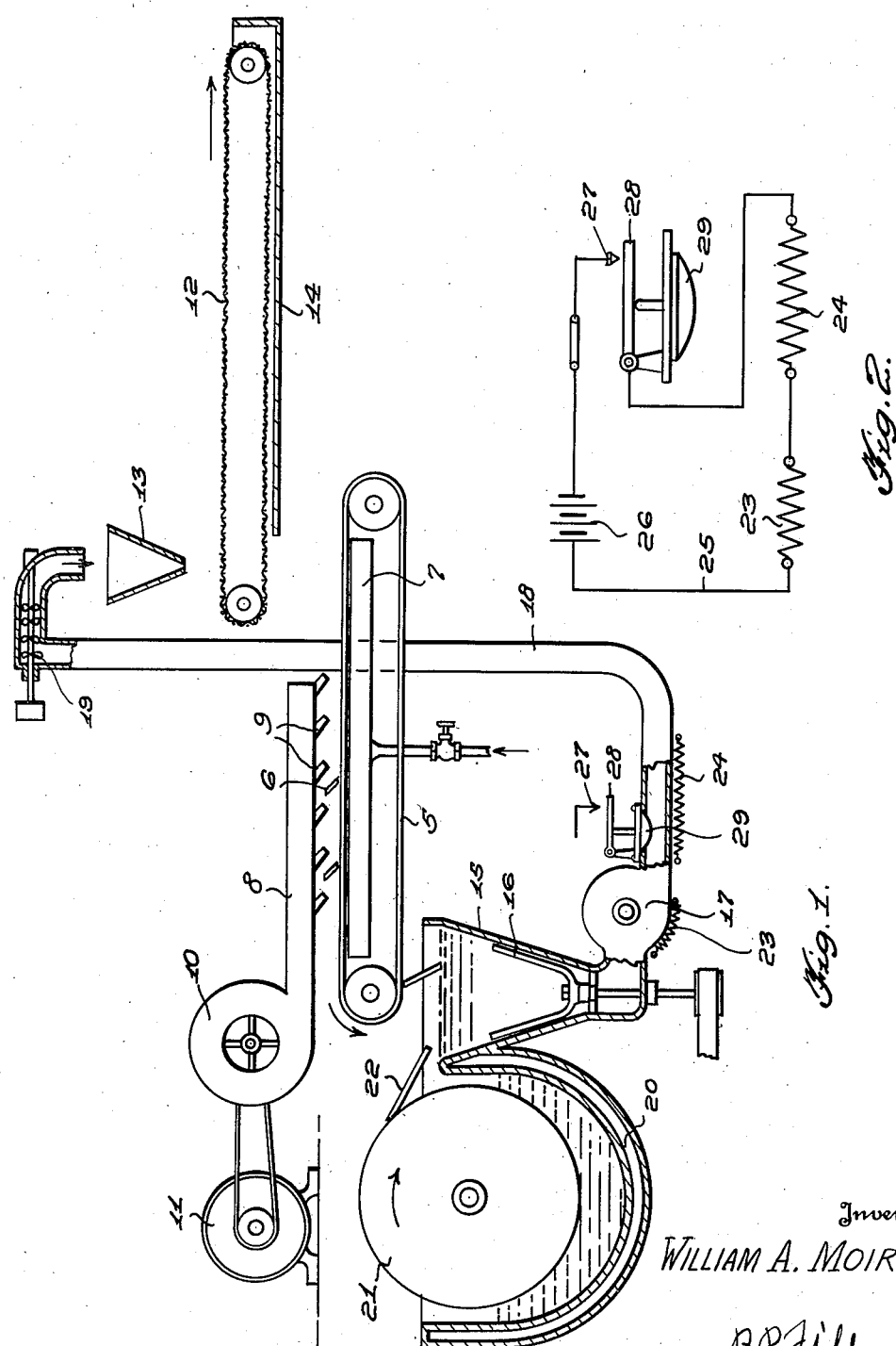
Inventor
WILLIAM A. MOIR,
B.P. Fishburne
Attorney Patented Dec. 10, 1935

2,023,741

UNITED STATES PATENT OFFICE 2,023,741

METHOD OF AND APPARATUS FOR TREATING CHOCOLATE MASSES

William Archibald Moir, St. Petersburg, Fla.

Application March 25, 1933, Serial No. 662,817

19 Claims. (Cl. 91—2)

My invention relates to a method of and apparatus for treating a chocolate mass or the like, for improving its properties.

In accordance with my method, a heated chocolate mass is passed over a support while being subjected to the action of cooling air blown thereon. This produces a chocolate mass having a fine grain. After this air cooling step, the mass is reheated, to reduce the stiffness or viscosity of the mass, and also to impart to the mass a desired characteristic. This characteristic is that the mass upon solidifying, as in a coating, will have a high gloss. This high gloss is believed due to the fact that the reheating remelts the fats in a small portion of the mass, and the free melted fats are mixed in a general way with the entire mass, producing the high gloss, as stated.

More specifically, I provide a method wherein the chocolate may be caused to move in a cycle to and from the machine within which the same is used, as in the coating of centers. As an illustration, the excess of chocolate from a coating machine is collected and subjected to the cooling action of the air while engaging a preferably traveling support, thereby causing the chocolate to have a fine grain. While passing over the traveling support, such support is preferably heated to regulate the temperature of the support so that the cooling action of the chocolate is effected principally by the action of the air currents thereon. After passing over the traveling support, the chocolate is collected and passed to a pump. In order to regulate the consistency of the chocolate and to produce a coating having a high gloss, additional chocolate having a lower grain content is introduced into the chocolate, preferably before it enters the pump. The pump draws both chocolate masses through the same, and will again feed the mixture to the coating machine. Instead of introducing into the chocolate mass the additional chocolate having a lower grain content, I have found that satisfactory results are obtainable by reheating the chocolate mass after the air cooling treatment, just before it enters the pump, while it is within the pump, or after leaving the pump. This reheating regulates the consistency of the mass and provides a coating having a high gloss.

An important feature of the invention resides in adding the low grain content chocolate to the mass after the air cooling, or in reheating the chocolate mass, after the air cooling step. I have found that this step in the method produces a chocolate coating which will have a high gloss when applied to centers. The reheating of the chocolate mass prior to the entrance of the same into the pump, or when within the pump, or after being discharged therefrom, is carried out in such a manner that the entire mass is not heated uniformly throughout. Only a relatively small amount of the mass has its temperature substantially increased, which is due to the fact that the mass is relatively thick, and does not thin quickly. The purpose of this is to leave the major portion of the chocolate mass in the normal grained condition and to provide a relatively small amount of the mass containing free melted fats, which is mixed in a general way throughout the entire mass. The presence of these free melted fats causes the high gloss or shine of the coating.

In the accompanying drawing, forming a part of this specification, and in which like numerals are employed to designate like parts throughout the same, Figure 1 is a diagrammatic view illustrating the apparatus for use in the practice of my method, and Figure 2 is a diagrammatic view of a circuit.

By "chocolate mass" is meant a mass containing ground cocoa beans, with or without added fat, or sugar.

The apparatus embodies a traveling support 5, in the form of an endless belt, moving in the direction of the arrow. This endless belt may be of canvas, or any suitable material. Arranged near and above the upper run of the belt 5 are stationary blades or scrapers 6, which are vertically inclined, and have their lower sharp edges arranged in close proximity to the upper run. The function of these stationary blades is to lift or separate the major portion of the chocolate mass from the upper run, during its travel, thus enabling the cooling air to more effectively reduce the temperature of the chocolate mass, thereby producing a fine grain in the chocolate mass. Arranged near and beneath the upper run of the belt 5 is a heating element 7, which may be of any well known or preferred type, such as steam operated, electrically operated, or the like. The purpose of this heating element is to heat or regulate the temperature of the upper run of the belt, preventing the same from cooling too rapidly, so that the major portion of the cooling action of the chocolate mass will be effected by the cooling action of the air blown thereon. This cooling action of the air produces a fine grain in the chocolate mass, while the cooling action of the chocolate mass, due to heat exchange with the traveling belt, produces a coarse grain. It is obvious that the fine grain is increased by reducing the cooling action of the traveling belt. However, the invention is not restricted to the heating of the upper run of the traveling belt, as some degree of success is obtained by omitting this heating action.

Arranged near and above the upper run of the belt 5 is a shell 8, preferably extending over the entire transverse area of the belt and throughout the major portion of its length. This shell is provided with nozzles 9, which are directed downwardly, and are preferably inclined toward the take-up end of the endless belt. These nozzles serve to direct downwardly the cooling air, ordinarily supplied at from 68° F. to 35° F. The temperature of the air controls the volume of the same to be used, and the temperature may be widely varied, although the temperatures given have been found to produce satisfactory results. Air is supplied under suitable pressure, into the shell by any suitable means, as from a rotary blower 10, driven by a motor 11.

The numeral 12 designates the screen belt of a coating or enrober machine, of any well known or preferred construction. This belt travels in the direction of the arrow. The chocolate mass having the desired fine grain and consistency is supplied to the centers placed upon the upper run of the belt 12, from a hopper 13. The major portion of the chocolate mass does not adhere to the centers, but passes through the screen belt, and discharges upon the intake end of the belt 5. Portions of the chocolate mass which fall from the coated centers are collected upon a pan 14, and the lower run of the belt 12 feeds this chocolate mass to the intake end of the belt 5.

The supporting belt 5 discharges the chocolate mass into a collecting receptacle or hopper 15, preferably provided with an agitator 16, for suitably stirring the mass. The chocolate mass is drawn from this hopper 15 by a rotary pump 17, of any well known or preferred type, and is fed into a pipe 18, which discharges into the hopper 13, as shown. I preferably arrange a rotary mixing device 19 in the pipe 18, near its discharge end.

Arranged adjacent to the hopper 15 is a reserve tank 20, preferably having a jacket for receiving hot water, so that the same may be maintained at a suitable temperature. A supply of chocolate mass is kept within this tank, and is maintained at a higher temperature than the chocolate mass within the hopper 15. I have found that satisfactory results are obtained by maintaining the chocolate mass within the tank 20 at from 93° F. to 95° F., although these temperatures may be widely varied. The temperature of the chocolate mass within the hopper 15 is ordinarily from about 82° F. to 92° F. A rotatable drum 21 is arranged within the tank 20 and turns in the direction of the arrow. The chocolate mass adheres to the periphery of the drum, and is removed therefrom by a scraper 22, and falls into the hopper 15. The amount of the chocolate mass passing from the tank 20 to the hopper 15 may be regulated by manually adjusting the scraper 22. The excess chocolate mass fed into the hopper 15 falls back into the tank 20. It is thus seen that the tank 20 and associated elements may be employed to maintain the level of the chocolate mass in the hopper 15 substantially constant.

It is thus seen that the chocolate mass from the coating or enrober machine is first collected upon the traveling belt 5, and passes under the shell 8, and is there subjected to the cooling action of the air, while being supported upon the belt, thereby producing a fine grain in the chocolate mass. This chocolate mass is next discharged into the hopper 15, wherein it may be stirred by the agitator 16, if desired. The chocolate mass is then withdrawn from the hopper by the rotary pump 17, and forced through the pipe 18, again mixed at 19, and finally discharged into the hopper 13, from which it passes to the coating machine. This cycle of operation is repeated and is continuous. After the cycle of operation has been repeated a number of times, the chocolate mass upon reaching the hopper 15, will have become so thick or stiff that it could not be satisfactorily employed as a coating. To overcome this excess stiffness of the mass, which would occur when the cycle of operation was repeated a number of times, the rotating drum 21 continuously supplies a suitable amount of the chocolate mass at a higher temperature into the hopper 15. This reheats the chocolate mass in the hopper 15, maintaining the viscosity of the mass at a selected degree, whereby the mass is prevented from becoming too stiff for use in the coating machine.

I also provide means to heat the casing of the pump 17, which may be in the form of an electrical heating unit 23, surrounding such casing. It is also preferred that an additional electrical heating unit 24 be applied to the pipe 18, near the pump. These two electrical heating units are preferably connected in series so that they are energized at the same time. They are connected in a wire 25, having a source of current 26. One end of the wire is connected with a stationary contact 27, arranged to be engaged and disengaged by a movable contact 28, having electrical connection with the opposite end of the wire 25. Contact 28 is adapted to be raised or shifted toward the contact 27 by a flexible diaphragm 29, of the desired stiffness. The diaphragm covers an opening formed in the pipe 18, at a point near the pump. When the chocolate stiffens or has a viscosity above that desired, the diaphragm 29 is forced outwardly, due to the increased pressure of the chocolate mass within the pipe 18, causing contact 28 to engage contact 27, thereby closing the circuit, whereby the heating elements 23 and 24 are energized, and the chocolate mass heated within the pump and within the adjacent portion of the pipe 18. This reduces the viscosity of the chocolate mass, and the pressure within the pipe 18, whereby the diaphragm 29 moves inwardly and contact 28 disengages contact 27. By this means, the stiffness or viscosity of the chocolate mass may be automatically maintained substantially constant.

By regulating the temperature of the chocolate mass within the tank 20, the use of the electrical heating means could be dispensed with. However, the tank 20 and associated elements may simply be employed to feed additional chocolate mass into the hopper 15, without regard to reheating of chocolate mass therein, but simply to compensate for the amount of chocolate mass applied to the centers, and in this event, the reheating of the chocolate mass would be effected by the electrical heating means. Further, some of the reheating might be effected by the chocolate from the tank 20, and some by the electrical heating means, these two means being used together, as may be found advantageous.

From the foregoing description, it will be seen that the method embodies the passing of the chocolate mass in cycles of operation, from the coating machine to the traveling support, blowing cooling air upon the chocolate mass for producing the fine grain, and from this traveling support, the chocolate mass is then collected in the hopper and withdrawn from the hopper by the pump, which again forces the chocolate mass through the pipe to the coating machine. To maintain the chocolate mass at a suitable consistency, or viscosity, the mass is reheated, but this reheating occurs entirely after the air cooling step. This reheating restores or maintains the desired viscosity, consistency or fluidity of the chocolate mass. This heat treatment at this point in the method is very important. It not only regulates the fluidity or viscosity of the chocolate mass, but imparts to the chocolate mass the characteristic whereby the coating upon the centers will have a high gloss. This high gloss is believed to be due to the fact that the reheating of the chocolate mass melts the fats in only a portion of the mass, which melted fats are mixed with the fine grain chocolate mass. It is believed that the presence of these free melted fats causes the high gloss in the coating. Particular attention is called to the fact that after the reheating treatment, which occurs subsequently to the air cooling treatment, that the chocolate mass is immediately fed to the coating machine and applied to the centers before the temperature of the mass has materially changed and the mass will retain its characteristic of producing a coating of high gloss and quick setting.

It is to be understood that the forms of my invention, herewith shown and described, are to be taken as preferred examples of the same, and that changes may be made in the order of the steps of the method, and that changes may be made in the shape, size and arrangement of parts of the apparatus, without departing from the spirit of my invention, or the scope of the subjoined claims.

Having fully described my invention, what I claim is:

1. In apparatus of the character described, a coating machine, a traveling support for receiving the excess chocolate mass from the coating machine, means to blow cooling air upon the chocolate mass upon the support, a receptacle for collecting the chocolate mass from the traveling support, means for reheating the chocolate mass, a conduit for supplying the chocolate mass to the coating machine, a pump connected in the conduit upon the outlet side of the receptacle, and pressure operated means connected in the conduit to automatically actuate the heating means.

2. In apparatus of the character described, a support, means to supply a heated chocolate mass to the support, means to blow cooling air upon the support, a receptacle for receiving the mass from the support, a pump to withdraw the mass from the receptacle, a conduit connected with the outlet side of the pump, a pressure operated device connected in the conduit, and means to heat the mass after it has passed into the receptacle, such heating means being thrown into action by the pressure operated device.

3. The method of coating candy centers or the like, comprising feeding a chocolate mass of suitable viscosity upon the candy centers while permitting the major excess portion of the mass to pass from the presence of the candy centers, collecting such excess chocolate mass and supporting and advancing the same, subjecting the collected chocolate mass during its travel to the action of cooling air blown directly upon the same for providing a fine grain within the chocolate mass, again collecting the chocolate mass after the cooling action, then re-heating the collected chocolate mass so that the fat content in a portion of the same is re-melted, and mixing the resultant chocolate mass and again feeding the same to candy centers to coat the same.

4. The method of coating candy centers or the like, comprising feeding a chocolate mass of suitable viscosity upon the candy centers while permitting the major excess of chocolate mass to separate from the presence of the candy centers, collecting the excess chocolate mass and supporting and advancing the same, subjecting the chocolate mass during its travel to the action of cooling air blown directly upon such mass for providing a fine grain in the mass, again collecting the chocolate mass after the cooling action, then re-heating the collected chocolate mass so that the fat content in a portion of the same is re-melted, mixing the resultant chocolate mass, and again feeding the resultant chocolate mass without substantially altering its properties to candy centers to coat the same, the several steps in the method producing a coating of high gloss.

5. The method of coating candy centers or the like, comprising feeding a chocolate mass of suitable viscosity to candy centers for coating the same while discharging the major excess portion of the chocolate mass from the presence of the candy centers, collecting the excess chocolate mass thus discharged and supporting and advancing the same, subjecting the chocolate mass during its travel to the action of cooling air blown directly upon such mass while regulating the temperature of the chocolate mass which might be varied by contact heat exchange so that the mass will have a fine grain, again collecting the chocolate mass after the cooling operation, re-heating the collected chocolate mass so that the fat content of a portion of the same is re-melted, mixing the resultant chocolate mass, and feeding the mixed chocolate mass without substantially altering its properties to candy centers to coat the same, the steps of the method producing a coating of high gloss.

6. The method of coating candy centers or the like, comprising supporting and advancing a fluid chocolate mass, subjecting the chocolate mass during its support and travel to the action of cooling air blown upon the mass for providing a fine grain throughout substantially the entire mass, collecting the chocolate mass after the cooling action, then re-heating the collected mass so that the fat content of a small portion only of the same is re-melted and the viscosity of the mass regulated, mixing the resultant chocolate mass, and then feeding the re-heated chocolate mass without substantially altering its properties upon the candy centers or the like, the steps of the method producing a chocolate coat of high gloss.

7. The method of producing a chocolate mass having a desired viscosity, comprising supporting and advancing a heated chocolate mass, subjecting the chocolate mass during its support and travel to the action of cooling air blown upon the mass for providing a fine grain throughout substantially the entire mass, collecting the chocolate mass thus subjected to the cooling action, then re-heating the collected chocolate mass so that the fat content of a small portion only of the same is re-melted, and mixing the resultant chocolate mass, the resultant chocolate mass being adapted for use in coating candy centers and will have a high gloss upon solidifying.

8. The method of producing a chocolate mass having a desired viscosity, comprising supporting and advancing a heated chocolate mass, subjecting the chocolate mass during its support and travel to the action of cooling air blown upon the same while subjecting the chocolate mass to agitation for providing a fine grain throughout substantially the entire mass, collecting the resultant chocolate mass, re-heating the collected chocolate mass so that the fat content of a small portion only of the same is re-melted, and mixing the resultant chocolate mass, the mixed re-heated mass being adapted to be fed to candy centers to coat the same and the mass having the properties of producing a high gloss upon solidifying.

9. The method of producing a chocolate mass having a desired viscosity, comprising supporting and advancing a heated chocolate mass, rapidly cooling the heated chocolate mass during its support and travel for producing a fine grain throughout substantially the entire mass, collecting the chocolate mass after the cooling treatment, re-heating the collected chocolate mass so that the fat content of a portion only of the same is re-melted, and mixing the resultant chocolate mass, the re-heated chocolate mass being adapted to be applied to candy centers to coat the same and having the properties of producing a high gloss upon solidifying.

10. The method of coating candy centers, comprising supporting and advancing a heated chocolate mass of desired viscosity, cooling the chocolate mass during its support and travel to produce a desired fine grain throughout substantially the entire mass, then collecting the chocolate mass after the cooling action, then subjecting a portion of the collected cooled chocolate mass to the action of heat to re-melt a portion only of the fat content of the same and thereby regulate the viscosity of the mass, mixing the resultant chocolate mass, and then applying the chocolate mass to candy centers to coat the same, the re-heating and mixing steps occurring near the end of the method so that the chocolate mass is applied to the centers in substantially an unaltered condition, the resultant chocolate mass having the properties of producing a high gloss upon solidifying.

11. The method of coating candy centers or the like, comprising supporting and advancing a heated chocolate mass of desired viscosity, subjecting the chocolate mass during its support and travel to the action of cooling air blown upon the same for providing a fine grain throughout substantially the entire mass, collecting the chocolate mass after the cooling action, then re-heating the chocolate mass by introducing into the same a chocolate mass of higher temeprature in the presence of agitation so that a portion only of the fat content of the cooled chocolate mass is re-melted, and feeding the re-heated chocolate mass upon the candy centers or the like, the steps of the method producing a chocolate coating of high gloss when solidified.

12. The method of producing a chocolate mass, comprising supporting and advancing a heated chocolate mass, subjecting the chocolate mass during its support and travel to the action of cooling air blown upon the mass for affording a fine grain throughout substantially the entire mass, collecting the chocolate mass after the cooling action, introducing into the collected chocolate mass a chocolate mass having a higher temperature to re-heat the cooled chocolate mass so that a portion only of the fat content of the re-heated chocolate mass is melted and the resultant mass will have the properties of producing a high gloss upon solidifying.

13. The method of producing a chocolate mass, comprising supporting and advancing a heated chocolate mass, subjecting the heated chocolate mass during its support and travel to the action of cooling air blown upon the mass while agitating the mass for affording a fine grain throughout substantially the entire mass, collecting the cooled chocolate mass, applying heat to the cooled chocolate mass and reheating a portion only of the same so that a portion of the fat content of the same is re-melted and the resultant mass will have the properties of producing a high gloss upon solidifying.

14. The method of coating candy centers or the like, comprising supporting and advancing a heated chocolate mass, subjecting the chocolate mass during its support and travel to the action of cooling air blown upon the same for providing a fine grain throughout substantially the entire mass, collecting the chocolate mass after the cooling treatment, applying heat to a portion of the chocolate mass so that a portion only of the fat content of the same is re-melted and the mass will have the properties of producing a high gloss upon solidifying, and regulating the re-heating action upon the chocolate mass with regard to the change in viscosity of the mass.

15. In apparatus for treating a fluid chocolate mass and feeding the same to the candy centers, a coating machine, a traveling support for receiving the excess chocolate mass from the coating machine, means separate from the coating machine and arranged to blow cooling air upon the chocolate mass upon the support, a receptacle for cooling the chocolate mass from the traveling support, means whereby the collected chocolate mass may be re-heated, a conduit for supplying the chocolate mass to the coating machine, a pump connected with the conduit and receptacle to force the chocolate mass through the conduit, and means to mix the chocolate mass before it is discharged from the conduit.

16. In apparatus of the character described, a coating machine comprising a foraminous traveling endless belt, a traveling support having its intake and extending beneath the foraminous belt to collect the excess chocolate mass passing through the same, a blowing device separate from the foraminous belt and arranged at a point remote from the same and disposed near and above the traveling support for directing cooling air upon the heated chocolate mass collected thereon, a receptacle arranged near the discharge end of the traveling support to receive the chocolate mass discharging therefrom, and means for re-heating and mixing the chocolate mass after it has passed into the receptacle and supplying the same to a point near the intake end of the foraminous belt to coat candy centers upon such foraminous belt.

17. In apparatus of the character described, a traveling support, means to feed a heated chocolate mass to the upper surface of the traveling support, means to heat the traveling support, a blower arranged to direct cooling air upon the chocolate fed to the upper surface of the traveling support, and means to agitate the chocolate during its travel to increase the cooling action of the air upon the same.

18. In apparatus of the character described, a traveling support, means to feed a heated chocolate mass upon the upper surface of the traveling support, heating means arranged near and beneath the lower surface of the traveling support, a blower arranged to direct cooling air upon the upper surface of the traveling support, and blades to scrape the chocolate mass from the traveling support and return the same thereon and increasing the cooling action of the blower.

19. In apparatus for coating candy centers or the like, a travelling support to receive thereon a fluid heated chocolate mass, means arranged to blow cooling air upon the heated chocolate mass to produce therein a fine fat grain, means for receiving the chocolate mass thus treated from the travelling support and to reheat the same so that a portion of the fat content is melted and viscosity is regulated, means to mix the reheated mass, and means to supply the chocolate mass thus treated to the candy centers.

WILLIAM ARCHIBALD MOIR.